United States Patent [19]

Klaue

[11] Patent Number: 4,726,245

[45] Date of Patent: Feb. 23, 1988

[54] SHIFT GEAR, SPECIFICALLY FOR MOTOR VEHICLES

[75] Inventor: Ing. H. Klaue, Cremlingen, Fed. Rep. of Germany

[73] Assignee: J. M. Voith GmbH, Heidenheim, Fed. Rep. of Germany

[21] Appl. No.: 841,530

[22] PCT Filed: Aug. 27, 1985

[86] PCT No.: PCT/EP85/00436

§ 371 Date: Feb. 26, 1986

§ 102(e) Date: Feb. 26, 1986

[87] PCT Pub. No.: WO86/01569

PCT Pub. Date: Mar. 13, 1986

[30] Foreign Application Priority Data

Aug. 28, 1984 [DE] Fed. Rep. of Germany ....... 3431486

[51] Int. Cl.$^4$ ............................ F16H 5/42; F16H 3/38
[52] U.S. Cl. ........................................ 74/336 R; 74/339
[58] Field of Search ................. 74/335, 336 R, 336.5, 74/337, 339, 340, 740, 760, 761, 801

[56] References Cited

U.S. PATENT DOCUMENTS

| | | | |
|---|---|---|---|
| 2,328,519 | 8/1943 | Wahlberg et al. | 74/340 |
| 3,396,610 | 8/1968 | Rich, Jr. et al. | 74/740 |
| 3,691,869 | 9/1972 | Klaue | 74/740 |
| 3,945,452 | 3/1976 | Klaue | 180/24.09 |
| 4,282,957 | 8/1981 | Sugimoto et al. | 74/740 |
| 4,368,650 | 1/1983 | Numazawa et al. | 74/740 |
| 4,403,526 | 9/1983 | Numazawa et al. | 74/740 |
| 4,404,869 | 9/1983 | Numazawa et al. | 74/740 |

FOREIGN PATENT DOCUMENTS

| | | |
|---|---|---|
| 0433675 | 8/1969 | Australia . |
| 0076591 | 4/1983 | European Pat. Off. . |
| 1909482 | 11/1969 | Fed. Rep. of Germany . |
| 3206424 | 10/1983 | Fed. Rep. of Germany . |
| 3417504 | 11/1985 | Fed. Rep. of Germany . |
| 2117555 | 7/1972 | France . |
| 2076912 | 12/1981 | United Kingdom ................. 74/761 |

OTHER PUBLICATIONS

Glover, Mechanisms, Linkages, and Mechanical Controls, 12/1965, Planetary Gear Systems, pp. 248–251.

Primary Examiner—Leslie Braun
Assistant Examiner—David Novais
Attorney, Agent, or Firm—Jeffers, Hoffman & Niewyk

[57] ABSTRACT

A shift gear, specifically for motor vehicles, has a main shaft (9) and an auxiliary shaft (8). Arranged on these shafts are several gear groups (56), (7); (14), (15); (16), (17), with two gears each being constantly in mesh. For shifting the gears, sliding sleeves (12), (13) are arranged on the main shaft (9), one of these sleeves at a time being positively couplable to one of the gears (56), (14), (16). To synchronize the sliding sleeve to be engaged, either a retarding device (20) or an accelerating device (46), (50) acts on the main shaft (9), depending on the direction of shift. A planetary gear train (50), which may be part of said accelerating device, has a gear component (22) which can be retarded by means of a friction brake (24) and forms a clutch device for interrupting the flow of power from an engine (51) to an output shaft (27). Serving also the starting, the clutch device is arranged on the transmission output. A shift clutch (29) is provided between the output shaft (27) and the brake rotor (24).

23 Claims, 2 Drawing Figures

SHIFT GEAR, SPECIFICALLY FOR MOTOR VEHICLES

The invention concerns a shift gear for power transmission from an engine to an output shaft, specifically for motor vehicles. The transmission of power occurs in such transmissions through positive shift elements. Absent are thus the frictional shift elements used in other transmissions, which in disengaged conditions cause power losses.

The invention is based on the German patent application No. P 34 17 504.0, not previously published. The shift gear described there has in addition to a central main shaft two auxiliary shafts. The inventional transmission may as well feature two auxiliary shafts. However, a design with only one auxiliary shaft is possible as well. Designing such shift gears with two auxiliary shafts is frequently desirable because, due to the branching of power possible thereby to two oppositely disposed mesh systems, it is possible to reduce the width of the gears and thus make the entire transmission smaller in length. Besides, the radial forces acting in pairs on the gears of the central main shaft counterbalance one another. The main shaft is thereby free of radial load.

The shift gear described in the above patent application possesses on the input end, for doubling the number of speeds, an intermediate shift gear and a pertaining double shift clutch. The latter is designed as a so-called dry friction clutch; that is, it is accommodated in a dry space for the transmission housing. Moreover, a central synchronizing device is provided on this shift gear for producing synchronism on the respective sliding sleeve to be engaged.

The synchronizing device comprises an accelerating device and a retarding device, both acting on the auxiliary shaft or on both auxiliary shafts. An electric controller is provided for automatic control of the sliding sleeves, the double shift clutch, and the central synchronizing device.

Still unsatisfactory on the shift gear described above is that at least part of the gear shift operations—despite automatic electrical control—takes too much time, so that the flow of power is interrupted for too long a time.

The problem underlying the invention is therefore to improve the shift gear so that the shift operations will be completed within a time shorter than heretofore.

The clutch device for interrupting the flow of power from the engine to the output shaft is inventionally arranged on the transmission output, so that the auxiliary shaft(s) and the gears which are in mesh with the auxiliary shaft gears while arranged on the main shaft are constantly coupled with the engine. If both the entirety of sliding sleeves and the clutch device are disengaged, only the main shaft will rotate, irrespective of the transmission input speed and irrespective of the transmission output speed. This makes it now possible to have the central synchronizing device act on the main shaft just mentioned. Owing to its much smaller rotating mass as compared to that of the auxiliary shaft(s) and of the gears rotating with it, the main shaft can be retarded or accelerated much faster in the synchronizing process. The time duration for the shift operations is considerably reduced thereby, and the shift operation is simplified. As a result, specifically the time duration of the power flow interruption is reduced, so that the automatic transmission control will operate more dependably than before.

As previously known as such from the German Pat. No. 32 06 424, the clutch device arranged on the transmission output comprises a planetary gear set of which one component rotates with the main shaft and another with the output shaft, and of which a third component can be retarded by means of a friction brake which may likewise be used for starting. For one, this enables the safe management of the higher moments occurring on the transmission output. At the same time, as is previously known as well from said German patent disclosure, the possibility lends itself to provide a friction clutch for bridging the planetary gear set. In turn, the clutch device can be used thereby for doubling the number of speeds available in the transmission, with a suitable graduation of the planetary gear.

The central synchronizing device acting on the main shaft features in previously known fashion a brake for retarding the main shaft; additionally it may feature—the same as in the initially mentioned shift gear according to patent application No. P 34 17 504.0—an additionally shiftable gear set for accelerating the main shaft. According to a further idea of the invention, however, an accelerating device for the main shaft will instead be created in that the clutch device arranged on the transmission output features a planetary gear with four components. The planetary gear has thereby a double function: for one, as previously mentioned, it serves to double the number of transmission speeds and, for another—as part of the central synchronizing device, to accelerate the main shafat.

Further inventional designs and embodiments will be more fully explained hereafter with the aid of the drawing.

Figure 1:
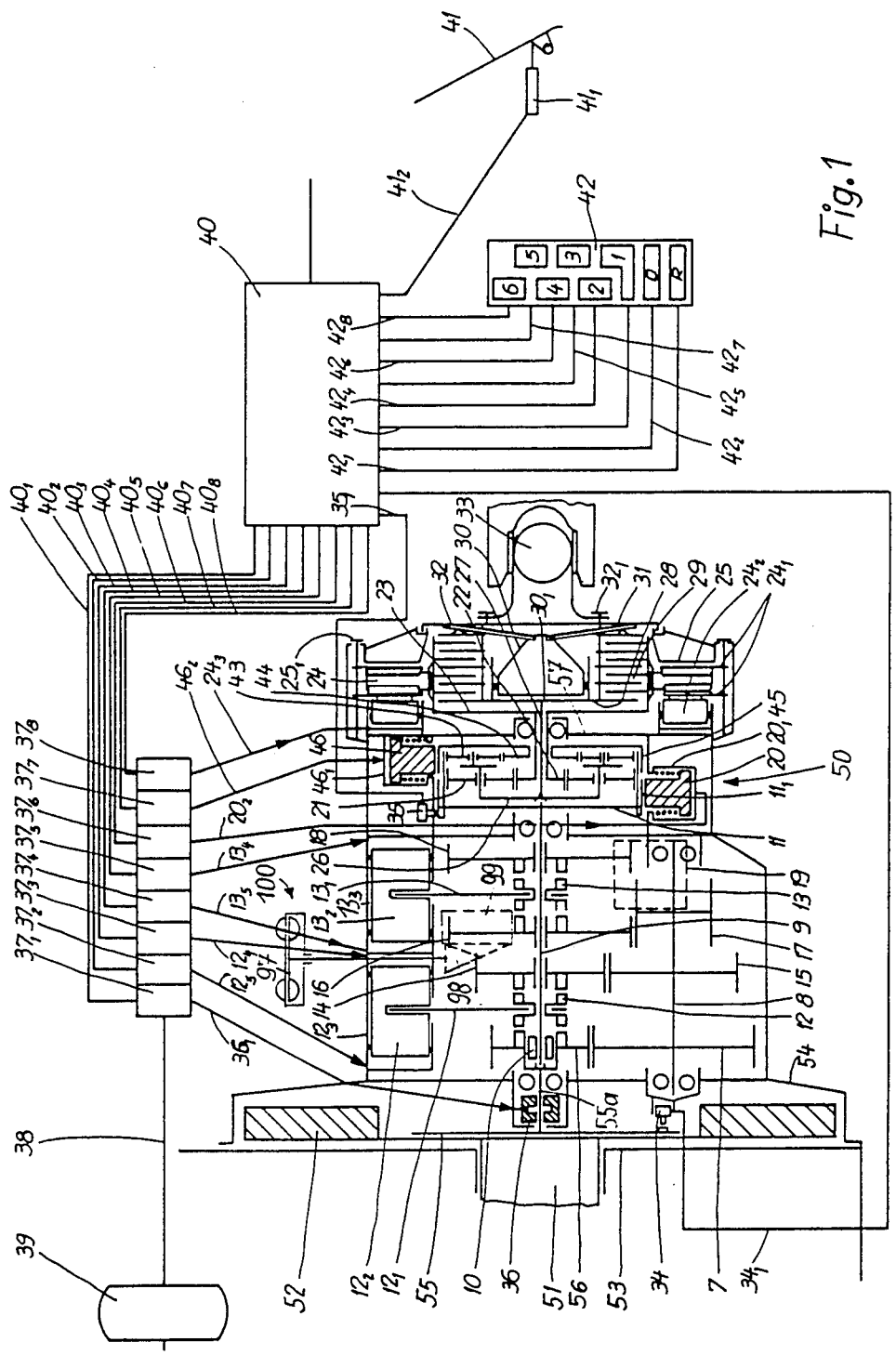
FIG. 1 shows schematically an inventional shift gear in longitudinal section, along with the pertaining controls.

Marked 51 in FIG. 1, the crank shaft with flywheel 52 connects by way of a flange 55 with the input shaft 55a of the shift gear, the housing 54 of which is flanged to the engine housing 53. Rotating continuously with the engine, the input gear 56 is in mesh with the gear 7 of the auxiliary shaft 8, by way of whose further gears 15 and 17 the gears 14, 16, 18 of the main transmission shaft 9 are driven. The main shaft 9 is mounted as usual in the input gear 56 by way of an antifriction bearing 10 and forms together with the ring gear 11, arranged on the other end, a unit. The present example concerns a 6-speed, pneumatically operated shift gear where three forward speeds and one reverse speed are shifted by sliding sleeves 12, 13 and a doubling of the number of forward speeds is obtained through the planetary shift gear which is arranged on the transmission output. For shifting, one of the sliding sleeves 12 and 13 arranged on the main shaft 9 is axially shifted and moved in positive connection with the respective speed gear 14, 16 or 18 on the main shaft or with the gear 56 of the input shaft 55a. The sliding sleeves 12 and 13 are repositioned by means of selector forks $12_1$ or $13_1$ through pistons $12_2$ or 13 which are mounted in cylinders $12_3$ and $13_3$. By coupling the sliding sleeve 12 with the speed gear 14, the third or fourth speed is shifted, and connecting the sleeve 13 with the speed gear 16 will shift the first or second speed. In mesh with the gear 17 of the auxiliary shaft 8, the gear 19 can shift the reverse gear by coupling the sliding sleeve 13 with the gear 18. The direct fifth or sixth gear is established by connecting the sliding sleeve 12 with the input gear 56. The illustrated shift gear comprises only one auxiliary shaft 8. As known in the art, two such auxiliary shafts may be provided.

The planetary split gear 50 arranged on the transmission output has two planetary gear planes. It is driven by way of the ring gear 11 which is integral with the main shaft 9. It outputs by way of the first-plane planetary gears 21 mounted on the planet carrier 26. The planet carrier 26 connects by way of the output shaft 27 with the inner ring 28 of a friction clutch 29 and powers from there, through the universal joint 33, the not illustrated vehicle wheels. The planetary gears 21 are in mesh with the ring gear 11 and with the sun gear 22 which connects by way of a hollow shaft with the outer ring 23 of the clutch 29. This outer ring 23 supports the hollow brake disk 24 of a friction brake which serves as starting brake and likewise, interacting with the planetary slit gear 50, serves as a clutch device for interrupting the power flow from the engine crank shaft 51 to the output shaft 27. The brake disk 24 features two disks $24_1$ which are equipped with a friction coating and engage pneumatically a housing ring 25 by way of an annular cylinder $24_2$. The shorting of the planetary split gear takes place through the clutch 29, half of its disks sitting on the outer ring 23 and the other half on the inner ring 28. The clutch is normally closed in that a disk spring 31 compresses the clutch disk package.

The starting takes place through operation of the brake 24, during which time the clutch 29 must be disengaged. This is brought about by admitting compressed air in the pressure space $30_1$ above the piston 30, thereby tensioning the disk spring 31. The operating air for the piston 30 of the clutch 29 is fed through a bore in the transmission main shaft 9 from a rotary air feed 36 on the input end of the transmission and through not illustrated rotary connectors between the shaft sections.

For rotational speed adaptation when shifting down, an electrical control 40 causes compresses air to be fed through the valve $37_6$ and the line $20_2$ into the cylinder $20_1$ of the brake piston 20. The piston 20 has on its end facing the planetary gear a friction lining which is brought in frictional contact with the drum $11_1$ of the ring gear 11, thereby slowing the transmission main shaft 9 down. If the control 40 determines by comparison of the rotational speed information transmitted by the sensor 34, by way of the line $34_1$, and sensor 35, by way of the line $35_1$, that synchronism is given between the respective sliding sleeve 12 or 13 and the speed gear to be shifted, the shift operation is initiated through the pneumatic valves $37_1$ through $37_5$.

In shifting up, the main transmission shaft 9 is accelerated by the following measures: Provided is a second planetary gear plane having planetary gears 43 which are mounted on the mentioned planet carrier 26 and mesh outside with the as well previously mentioned ring gear 11, and inside with an additional sun gear 44. The latter is connected with the brake drum 45 which can be retarded by means of the brake 46. For rotational speed synchronization, the control 40 (after being instructed to shift) initiates via the electrical line $40_1$ the changeover of the pneumatic valve $37_1$ operated by solenoid. Consequently, compressed air flows through the line $36_1$ and the rotary air feed 36 into the space $30_1$ of the piston 30, disengaging the clutch 29.

At the same time, compressed air flows through the line $46_2$ and through the solenoid valve $37_7$ (actuated via the electrical line $40_7$) into the cylinder space $46_1$, engaging the brake 46. This causes the ring gear 11, and thus the main transmisson shaft 9, to accelerate by way of the planetary gears 43, which via the sun gear 44 bear on the brake drum 45. The same as in shifting down, the shift operation is initiated then by the controller, upon comparison of the rotational speed information transmitted by the sensors 34 and 35, if synchronism exists between the respective sliding sleeve and the respective gear.

Since only the main shaft 9 with the ring gear 11 needs to be accelerated or retarded during synchronization, the shift operations are completed within a relatively short time. Either a manually operated push button control or a fully automatic system can be employed for shifting the speeds. The two can be combined in such a way that the actuation is fully automatic and that it can be influenced by a push button control, for instance to prevent an up and/or down shifting on up from a specific speed. The shifting operation will be described hereinafter.

The operator pushes the shift button 6 on the control panel 42, thus instructing the controller 40 via the line $42_8$ to automtically shift up to the highest speed. While still in standstill, with brake 24 and clutch 29 disengaged, the sliding sleeve 13 is thus moved into the shifting claws of the gear 16 in that he solenoid compressed air valve $37_5$, actuated by the controller 40 via line $40_5$, opens and the double piston $13_2$ in the cylinder $13_3$ moves the selector fork $13_1$, due to compressed air being fed through the line $13_4$, toward the gear $16$.

Moved for starting, the gas pedal 41 is equipped with a sensor $41_1$ whose information is transmitted as well to the controller 40 via the line $41_2$. Upon the rotational speed information from the sensor 34, increased air pressure is admitted in the operating space of the annular piston $24_2$ as the engine speed increases, through the compressed air valve $37_8$ which is fashioned as a control valve and connects by way of the line $40_8$ with the controller, thereby engaging the brake 24. The vehicle is starting. Upon reaching a specific engine speed, which is being reported via the line $34_1$, the controller causes the compressed air to be vented both from the cylinder of the annular piston $24_2$ of the brake and the space $30_1$, by way of the rotary air feed 36 and the valve $37_1$, thereby short-circuiting the planetary split gear 50 in that the spring 31 compresses the disks. This shifts the second speed.

Another instruction from the rotational speed sensor 34 causes pressure to be admitted in the space $30_1$, through the valve $37_1$, thereby disengaging the clutch 29. Next, the double piston $13_2$ moves through opening of the valve $37_5$ into zero position, causing the sliding sleeve 13 to release the gear 16. Practically simultaneously, the controller actuates the valve $37_7$ permitting compressed air to proceed into the cylinder $46_1$, so that the drum 45 and the sun gear 44 will be retarded. The gearing which becomes effective thereby between the planetary gear mount 26 and the ring gear 11 keeps accelerating the main transmission shaft 9 until the sensors 34 and 35 report synchronism. Then, compresses air is admitted simultaneously in the cylinder $12_3$ by way of the valve $37_2$ and the line $12_5$, and the brake 46 is briefly disengaged by way of the valve $37_7$ and the line $46_2$. The double piston $12_2$ pushes the sliding sleeve 12 through the fork $12_1$ into the shifting claws of the gear 14. Next, the controller 40 actuates via the electrical line $40_8$ the valve $37_8$, thereby admitting compressed air into the circular cylinder $24_2$ and engaging the brake 24. The third speed has now been shifted.

To shift the fourth speed, the brake 24 is disengaged and the clutch 29 engaged. For shifting the fifth gear, the clutch 29 is disengaged again and the brake is engaged. Upon completion of the synchronization between the sliding sleeve 12 and the gear 56, the brake 46 is disengaged again and, analogous to shifting from the first to the second speed, compressed air is admitted, through actuation of the valve $37_3$, in the cylinder $12_3$ for moving the double piston $12_2$ and the fork $12_1$ with sliding sleeve 12 toward the gear 56. Once the sliding sleeve 12 and the gear 56 are in mesh, the brake 24 is engaged again. A subsequent signal from the rotational speed sensor 34 again causes the brake 24 to disengage and likewise the clutch 29 to engage by venting the pressure space $30_1$. Thereafter, the sixth gear has been shifted.

The downshift operation is initiated by the controller at a specific engine speed, programmed in the controller, governed by the gas pedal position. The pertinent information is signaled to the controller by the rotational speed sensor 34 and the travel sensor 41.

To shift from the sixth to the fifth speed, the controller disengages through actuation of the valve $37_1$ the clutch 29 and engages the brake 24 through actuation of the valve $37_8$, thereby shifting into fifth gear. The necessary speed synchronization between the sliding sleeve 12 and the gear 14 occurs in shifting down from fifth to fourth gear in that the controller disengages the brake 24 through actuation of the pneumatic valve $37_8$ and disengages the sliding sleeve 12 from the gear 6 through actuation of the valve $37_3$. Next, the controller actuates the valve $37_6$ and admits compressed air on the piston 20, thereby retarding the ring gear 11 with the sliding sleeve 12 to a level such that the two rotational speed sensors 34 and 35 will report synchronism to the controller. In this instant, the solenoid valve $37_2$ is actuated and the sliding sleeve connected with the gear 14. Finally, the brake 24 is engaged again. The fourth gear has now been shifted.

The further shifting from the fourth to the third gear proceeds in the same manner as shifting from the sixth to the fifth gear, the shifting from third to second gear in the same manner as shifting from the fifth to the fourth gear, and lastly shifting from the second to the first gear again the same as shifting from the sixth to the fifth gear.

If the operator wants to rev the engine without moving the vehicle, he must push the zero button on the control panel. In reverse gear, which can be shifted only in standstill, the sliding sleeve 13 is connected with the gear 19 by actuating the valve $37_4$, thereby admitting compressed air through the line $13_5$ into the cylinder $13_3$.

The arrangement of the planetary gear on the output end, among other things, offers the advantage that the multiple speed gear can be arranged directly next to the flywheel. To increase their efficiency, the brake 24 and clutch 29 are arranged in a dry space. Since the brake serves as a starting element, both the area of the friction lining $24_1$ and the surface of the rotating brake element must be so dimensioned that the output converted to heat in starting will be dissipated by the air and/or the surrounding transmission components without overly heating the surrounding parts. This problem is considerably easier to solve with the friction elements arranged on the output end rather than in the engine flywheel space.

Figure 2:
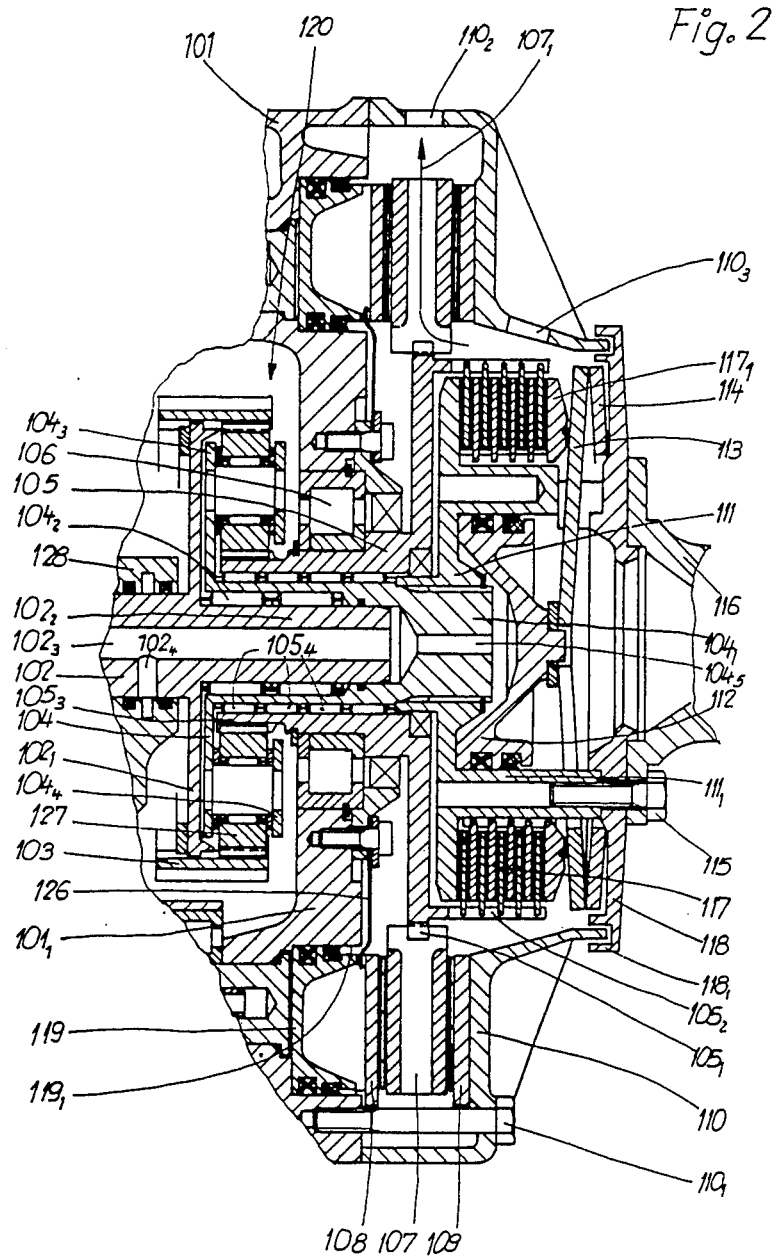
FIG. 2 shows several construction details of the clutch device arranged at the transmission output, also in longitudinal section.

FIG. 2 presents a suitable design of the brake and clutch in conjunction with a planetary shift gear featuring only a single planetary gear plane. The arrangement is such that only little axial space is needed so as to keep the overall length of the shift gear short. Besides, attention was paid to arranging wear parts operating in the dry space in such a way that they can be replaced without removal and disassembly of the transmission.

Mounted in the transmission housing 101, the main shaft 102 is equipped with a disk extension $102_1$ on which the ring gear 103 is mounted. In the present example, the ring gear 103 features in addition to the internal gearing for the planetary drive also an external gearing intended to mesh with a gear of an acceleration device brake 130.

The end wall $101_1$ of the transmission housing 101 supports the output bearing 106 of the transmission. The ring gear 103 located before the end wall $101_1$ is in mesh with the planetary gears 127 which are mounted on the two-part planet carrier $104_3$, $104_4$ of the output shaft 104. The main transmission shaft 102 is mounted with its extension $102_2$, through the intermediary of the double-needle bearing $104_2$, in a recess in the output shaft 104.

The sun gear $105_3$ of the planetary gear set is an integral part of the clutch hollow shaft 105 supporting the clutch outer ring $105_2$ and the brake disk 107 and is supported on the transmission end wall $101_1$ by the bearing 106. The clutch flange 111 with the inner ring $111_1$ of the clutch 117 is driven by way of the output shaft 104 which is mounted in a recess provided in the clutch hollow shaft 105, on needles $105_4$. The inner ring $111_1$ of the clutch is likewise fashioned as a cylinder for receiving the disengaging piston 112 of the clutch.

The clutch 117 and brake 107 operate in the dry space of the transmission and are outwardly encased by the brake housing 110 and the clutch lid 118. Having a hollow design, the brake disk is sitting in axially movable fashion on the teeth $105_1$ of the clutch hollow shaft 105 and is retained, for starting and shifting, by the two brake lining disks 108 and 109. These lining disks 108 and 109 are attached to mounting screws $110_1$ of the brake housing 110 and are forced on the brake disk by the annular piston 119, for braking. The annular piston is mounted in a circular piston recess $119_1$ of the transmission end wall $101_1$. The brake housing features recesses $110_2$ and $110_3$ through which cooling air, moved by the hollow brake disk in the direction of arrow $107_1$, is introduced and vented.

The compressed air for disengaging the clutch 117 proceeds from the stationary rotary feed 128 through the transverse bore $102_4$, the axial bore $102_3$ in the transmission main shaft 102, and the axial bore $104_5$ in the output shaft into the space betwen the disengaging piston 112 and the clutch flange 111. With the clutch 117 disengaged, the disengaging piston 112 has the disk springs 113 and 114 stressed to a point such that the pressure plate $117_1$ mounted on the inner ring $111_1$ of the clutch flange 111 is disengaged and the disk package runs freely. This is the condition, in which the clutch 117 will be in starting. Next, compressed air regulated by a control valve is passed into the ressure space between the annular cylinder recess $119_1$ in the transmission end wall $101_1$, and to the annular piston 119, establishing frictional engagement between the brake lining disks 108 and 109 and the brake disk 107. This causes the sun gear $105_3$ to be retained through the clutch hollow shaft 105, and the vehicle drive begins from the ring gear 103 through the planetary gears 127, the carrier 104₃, 104₄, the output shaft 104, the clutch flange 111 and the universal shaft 116 which powers the vehicle axle.

With the clutch 117 engaged, i.e., the disengaging piston 112 unpressurized, and with the disk package compressed by the disk springs 113 and 114, the planetary gear is short-circuited, the drive occurs thus directly from the main transmission shaft 102 via the clutch hollow shaft 105, clutch flange 111 and to the universal shaft 16.

The multiple-speed gear need not be opened to change wear parts of the group transmission. With the universal shaft 116 removed by loosening the screws 115, the disk springs 113 and 114 are unstressed after removal of the clutch lid 118 and can be removed. Next, the disk package of the clutch 117 and/or its lined disks are to be replaced. If the lining disks 108 and 109 of the brake are to be replaced as well, the brake housing 110 must be removed by loosening the screws 110₁, removing then the lining disks 108 and 109 along with the brake disk 107 and replacing them. Neither the clutch nor the brake controls need to be removed for this procedure.

FIG. 1 shows schematically also how, if required, a hydrodynamic retarder 100 can be arranged:

For instance, the speed gear 16 is in mesh with the gear 99; this gear connecting through an angular gear 98 with the retarder rotor 97. It is essential that the retarder rotor is connected to those transmission parts whose rotational speed is always proportional to the engine speed. If the retarder rotor were instead coupled with the main shaft 9, its rotational mass would prolong the time needed for synchronization when shifting gears.

I claim:

1. A shift gear arrangement for a motor vehicle transmission, which motor vehicle has an engine;
   said transmission comprising a housing, an input shaft, an output shaft, a main shaft and at least one auxiliary shaft, which transmission is operable to transfer power between said engine and said output shaft;
   a plurality of gear groups, each of said gear groups having at least two gears which are in constant mesh, said gears mounted on said main shaft and said at least one auxiliary shaft;
   each of said auxiliary shaft mounted gears of said gear groups is secured to and rotates with said auxiliary shaft;
   each of said main shaft mounted gears of said gear groups is rotatable on said main shaft;
   sliding sleeves mounted on said main shaft, said sleeves nonrotatable about said main shaft and axially slidable thereon to engage and couple at least one of said main shaft mounted gears;
   a clutch device mounted in said transmission is operable as a starting clutch and to interrupt power transfer from the engine to the output shaft,
   said clutch device having a friction brake with a rotor (24;107) and a planetary gear set (50; 120), which planetary gear set has a plurality of gear components including a first component (11; 103) constantly coupled with said main shaft (9, 102), and a second component (22; 105₃) constantly coupled to the rotor (24; 107) of the friction brake, and a third component (26; 104₃) constantly coupled to said output shaft (27, 104);
   a shift clutch (29) mounted in said transmission and operable between said output shaft (27, 104) and said brake rotor (24, 107);
   a central synchronizing device including an electronic control and being arranged to provide one of acceleration and retardation of said main transmission shaft via said clutch device at disengagement of said sliding sleeves, said synchronizing device operable to cooperate with each sliding sleeve to positively couple said sleeve with at least one gear on said main shaft.

2. A shift gear arrangement as claimed in claim 1 wherein said planetary gear set (50) has first, second, third and fourth gear components, and includes a first synchronizing brake (20) and a second synchronizing brake (46);
   said planetary gear set first gear component (11) mouned on and rotatable with said main shaft, said first gear component operable to be retarded by said first synchronizing brake (20);
   said friction brake is operable to retard said planetary gear set second gear component (22), to serve as a starting clutch and to be coupled to said output shaft by said shift clutch (29);
   said third gear component (26) connected to said output shaft (27); and,
   said planetary gear set fourth gear component (44) operable to be retarded by said second synchronizing brake (46) to accelerate said main shaft (9).

3. Shift gear according to claim 2, characterized by the following features:
   (a) the first gear component (11) is a ring gear which is engaged by two planetary gear groups (21, 43) which are arranged side by side with a common planet carrier (26) and a first sun gear and a second sun gear (22, 44);
   (b) the second gear component is said first sun gear (22);
   (c) the third gear component (26) is said planet carrier; and,
   (d) the fourth gear component is the second sun gear (44).

4. A shift gear arrangement as claimed in claim 2 wherein said transmission housing defines an end wall in said transmission housing which end wall and housing cooperate to define a day space generally in proximity to said output shaft, and downstream of said planetary gear set;
   said friction brake having at least one friction face;
   said shift clutch having at least one friction face;
   said friction brake and shift clutch friction faces mounted and operable in said dry space.

5. A shift gear arrangement as claimed in claim 4 wherein said transmission housing end wall defines a circular cylindrical recess; said friction brake is a full-lining disk brake; and said friction brake has an operating piston positioned in said circular cylindrical recess and operable to activate said friction brake.

6. A shift gear arrangement as claimed in claim 2 further comprising a spring biasing said shift clutch into an engaged position; and,
   a disengaging piston generally centrally mounted in said clutch device, which disengaging piston is operable to retract said spring and disengage shift clutch.

7. A shift gear arrangement as claimed in claim 6 wherein said motor vehicle includes a drive shaft with a flange; said shift clutch has an inner ring generally defining a cylinder for said disengaging piston; and, said transmission has a clutch lid, which clutch lid and drive shaft flange are screw-mounted on said shift clutch inner ring.

8. A shift gear arrangement as claimed in claim 2 wherein said transmission has a longitudinal axis; said friction brake includes a hollow brake disk; and, said shift clutch includes an outer ring with extensions, which hollow brake disk is mounted on said extensions and movable in the longitudinal axis direction.

9. A shift gear arrangement as claimed in claim 2 further comprising a hydrodynamic retarder with a rotor and an angular gear; said angular gear coupled to one of the gears of said gear groups mounted on said main shaft and auxiliary shaft.

10. Shift gear according to claim 1, characterized by the following features:
  (a) the planetary gear set has three gear components ($103$, $104_3$, $105_3$);
  (b) the first gear component is a ring gear ($103$) which rotates with the main shaft ($102$);
  (c) the second gear component is a sun gear ($105_3$) connected with the brake rotor ($107$); and,
  (d) the third gear component is a planet carrier connected with the output shaft ($104$).

11. A shift gear arrangement as claimed in claim 1 wherein said transmission housing has an end wall in said housing, which end wall and housing cooperate to define a dry space in said housing, which dry space is generally in proximity to said output shaft, and downstream of said planetary gear set;
  said friction brake having at least one friction face;
  said shift clutch having at least one friction face;
  said friction brake and shift clutch friction faces mounted and operable in said dry space.

12. A shift gear arrangement as claimed in claim 11 wherein said transmission housing end wall defines a circular cylindrical recess; said friction brake is a full-lining disk brake, and said friction brake has an operating piston positioned in said circular cylindrical recess and operable to activate said friction brake.

13. A shift gear arrangement as claimed in claim 1 further comprising a spring biasing said shift clutch into an engaged position; and,
  a disengaging piston generally centrally mounted in said clutch device, which disengaging piston is operable to retract said spring and disengage said shift clutch.

14. A shift gear arrangement as claimed in claim 13 wherein said motor vehicle includes a drive shaft with a flange; said shift clutch has an inner ring generally defining a cylinder for said disengaging piston; and, said transmission has a clutch lid, which clutch lid and drive shaft flange are screw-mounted on said shift clutch inner ring.

15. A shift gear arrangement as claimed in claim 1 wherein said transmission has a longitudinal axis; said friction brake includes a hollow brake disk; and, said shift clutch includes an outer ring with extensions, which hollow brake disk is mounted on said extensions and movable in the longitudinal axis direction.

16. A shift gear arrangement as claimed in claim 1 further comprising a hydrodynamic retarder with a rotor and an angular gear; said angular gear coupled to one of the gears of said gear groups mounted on said main shaft and auxiliary shaft.

17. A shift gear arrangement for a motor vehicle transmission, which motor vehicle has an engine;
  said transmission comprising a housing, an input shaft, an output shaft, a main shaft and at least one auxiliary shaft, which transmission is operable to transfer power between said engine and said output shaft;
  a plurality of gear groups, each of said gear groups having at least two gears which are in constant mesh, said gears mounted on said main shaft and said at least one auxiliary shaft;
  each of said auxiliary shaft mounted gears of said gear groups is secured to and rotates with said auxiliary shaft;
  each of said main shaft mounted gears of said gear groups is rotatable on said main shaft;
  sliding sleeves mounted on said main shaft, said sleeves nonrotatable about said main shaft and axially slidable thereon to engage and couple at least one of said main shaft mounted gears;
  a clutch device mounted in said transmission is operable as a starting clutch and to interrupt power transfer from the engine to the output shaft,
  said clutch device having a friction brake with a rotor ($24$, $107$) and at least one friction face, and a planetary gear set ($50$, $120$) with a plurality of gear components ($103$, $104_3$, $105_3$),
  the first gear component ($11$, $103$) is a ring gear ($103$) which rotates with the main shaft ($102$), the second gear component ($22$, $105_3$) is a sun gear ($105_3$) connected with the brake rotor ($107$), and the third gear component ($26$, $104_3$) is a planet carrier connected with output shaft ($104$);
  a shift clutch ($29$) with at least one friction face mounted in said transmission and operable between said output shaft ($27$, $104$) and said brake rotor ($24$, $107$);
  a central synchronizing device including an electronic control and being operable to selectively provide one of acceleration and retardation of said main transmission shaft via said clutch device at disengagement of said sliding sleeves, said synchronizing device operable to cooperate with each sliding sleeve to positively couple said sleeve with at least one gear on said main shaft,
  said housing having an end wall, which housing and end wall cooperate to define generally in proximity to said output shaft, and downstream of said planetary gear set a dry space in said housing;
  said friction brake and shift clutch friction faces mounted and operable in said dry space.

18. A shift gear arrangement for a motor vehicle transmission as claimed in claim 17 further comprising a spring biasing said shift clutch into an engaged position; a disengaging piston generally centrally mounted in said clutch device, which disengaging piston is operable to retract said spring and disengage said shift clutch;
  said friction brake is a full-lining disk brake and has an operating piston;
  said housing end wall defining a circular cylindrical recess, said friction brake operating piston positioned in said recess and operable to activate said friction brake.

19. A shift gear arrangement for a motor vehicle transmission as claimed in claim 18 wherein said transmission has a longitudinal axis; said friction brake disk is a hollow brake disk; and said shift clutch includes an outer ring with extensions, which hollow brake disk is mounted on said extensions and is movable in the longitudinal direction.

20. A shift gear arrangement as claimed in claim 18 wherein said motor vehicle includes a drive shaft with a flange; said shift clutch has an inner ring generally defining a cylinder for said disengaging piston; and, said transmission has a clutch lid, which clutch lid and drive shaft flange are screw-mounted on said shift clutch inner ring.

21. A shift gear arrangement as claimed in claim 17 further comprising a hydrodynamic retarder with a rotor and an angular gear; said angular gear coupled to one of the gears of said gear groups mounted on said main shaft and said auxiliary shaft.

22. A shift gear arrangement as claimed in one of claims 17-21 wherein said planetary gear set (50) has first, second, third and fourth gear components and includes a first synchronizing brake (20) and a second synchronizing brake (46);

said planetary gear set first gear component (11) mouned on and rotatable with said main shaft, said first gear component (11) operable to be retarded by said first synchronizing brake (20);

said friction brake operable to retard said planetary gear set second gear component (22), to serve as a starting clutch and to be coupled to said output shaft by said shift clutch;

said third gear component (26) connected to said output shaft (27); and, said planetary gear set fourth gear component (44) operable to be retarded by said second synchronizing brake (46) to accelerate said main shaft (9).

23. A shift gear arrangement for a motor vehicle transmission, which motor vehicle has an engine;

said transmission comprising a housing, an input shaft, an output shaft, a main shaft and at least one auxiliary shaft, which transmission is operable to transfer power between said engine and said output shaft;

a plurality of gear groups, each of said gear groups having at least two gears which are in constant mesh, said gears mounted on said main shaft and said at least one auxiliary shaft;

each of said auxiliary shaft mounted gears of said gear groups is secured to and rotates with said auxiliary shaft;

each of said main shaft mounted gears of said gear groups is rotatable on said main shaft;

sliding sleeves mounted on said main shaft, said sleeves non-rotatable about said main shaft and axially slidable thereon to engage the couple at least one of said main shaft mounted gears;

a clutch device mounted in said transmission is operable as a starting clutch and to interrupt power transfer from the engine to the output shaft, said clutch device having a first friction brake with a rotor (24; 107) and a planetary gear set (50; 120), which planetary gear set has a plurality of gear components including a first component (11; 103) constantly coupled with said main shaft (9, 102), and a second component (22; $105_3$) constantly coupled to the rotor (24; 107) of the friction brake, and a third component (26; $104_3$) constantly coupled to said output shaft (27, 104);

a shift clutch (29) mounted in said transmission and operable between said output shaft (27, 104) and said brake rotor (24, 107);

an accelerating device for accelerating the main shaft, and a second friction brake for decelerating said main shaft;

a central synchronizing device including an electronic control and being arranged to provide one of acceleration and retardation of said main transmission shaft via said accelerating device and said second friction brake, respectively, at disengagement of said sliding sleeves, said synchronizing device operable to cooperate with each sliding sleeve to positively couple said sleeve with at least one gear on said main shaft.

* * * * *